March 3, 1964

M. P. O'NEILL ETAL  3,122,912

METHOD FOR DETERMINING POUR POINT

Filed June 7, 1962

Michael P. O'Neill
Benjamin W. Kanzler
Inventors

By Frank T. Johnmann
Patent Attorney 3,122,912
METHOD FOR DETERMINING POUR POINT
Michael P. O'Neill, New Providence, and Benjamin W. Kanzler, Linden, N.J., assignors to Esso Research and Engineering Company, a corporation of Delaware
Filed June 7, 1962, Ser. No. 200,755
6 Claims. (Cl. 73—17)

This invention relates to a method for measuring the pour points of liquid compositions. More specifically, this invention relates to a method for determining the pour point of a normally liquid composition (at 77° F.) by heating the composition from a temperature below its pour point to a temperature above its pour point while simultaneously transmitting pulsating pressure impulses through the composition and measuring the amplitude of the impulse transmitted through the composition as a function of temperature.

UTILITY

The method described herein is suitable for use with any normally liquid composition. It is particularly applicable to oils, including synthetic lubricating oils, mineral lubricating oils, and fuel oils, since the pour point of these oils is an important aspect of their quality evaluation.

GENERAL

Conventionally, pour points of oils are determined by the test identified as ASTM–D–97. Briefly, this test consists of placing a sample of the oil, whose pour point is to be determined, into a stoppered test tube. A thermometer is inserted into the test tube so that the bulb of the thermometer is immersed in the oil. The tube is then placed vertically into a cooling medium so that the temperature of the oil is gradually lowered. Periodically, an operator manually removes the tube containing the oil from the cooling medium and tilts the tube, noting any movement of the surface of the oil. This is done at about 5° F. intervals. The pour point of the sample is defined as 5° F. above the highest temperature at which the oil ceases to move when the test tube is held in a horizontal position.

In modern day practice in oil refineries, hundreds of the above-described pour point tests are carried out and require the presence of an operator whose judgment and skill are relied upon for the determination of the pour points. Using the ASTM method, the manipulations are made by hand and there is a high variance from sample to sample and from operator to operator. For any particular oil, the results obtained by several operators may vary as much as 15° F. Therefore, there is a lack of repeatability of results when the ASTM method is used, although it is the primary standard of industry.

METHOD OF OPERATION

According to the present invention, a liquid composition (test sample) to be tested is placed into a container. Cooling means, such as a thermo-electric device or a cooling bath, are used to lower the temperature of the test sample below its pour point and to solidify it. Generally, this temperature will be from 5° to 50° F. below the pour point, usually 10° to 30° F., e.g., 20° F. Energy in the form of a pulsating pressure is then applied to the base of the sample by any convenient means. The amplitude of the pulsating pressure is chosen so that initially the movement of the congealed sample is slight, even imperceptable. The sample is warmed, e.g., 0.3° to 20° F. per minute, preferably 0.5° to 5° F. per minute. As the sample is warmed the movement of the free surface of the sample will increase in response to the applied pressure. The frequency of the pulsating pressure may be from 5 to 45 cycles per minute, preferably 20 to 35 cycles per minute and more preferably about 30 cycles per minute. Above the liquid sample is an enclosed space filled with a gaseous medium, e.g., air which is connected to a pressure sensitive device. A temperature measuring means is maintained in contact with the sample. As applied pulsating pressures of fixed amplitude are transmitted through the sample, the movement of the surface of the sample against the enclosed gas above it will compress and rarefy the gas causing a fluctuation in the output of the pressure sensitive device. Initially, the congealed sample will restrict the transmission of these pulses to a small fraction of the force applied and consequently, these compressions and rarefactions will be slight. When the temperature of the sample is in the vicinity of its pour point the fluidity of the sample will increase so substantially that there will be an appreciable difference in the magnitude of the pressure change of the air above the fluidizing sample as compared with that above the sample in a more congealed or solid state. By either visually observing this change or by employing suitable means of automatically recording such changes as a function of temperature, the pour point can be accurately determined with a high degree of repeatability.

The amplitude of the applied pressure impulses will preferably vary between about 0.1 and 20 mm. Hg and more preferably from 0.2 to 16 mm. Hg, e.g., 6 mm. Hg, above atmospheric pressure. The transmitted pressure impulses measured after passage through the sample will vary in amplitude with respect to the viscosity of the sample. In practice, the amplitude of the transmitted pressure impulses will be somewhat less than that of the amplitude of the applied pressure impulses due to the damping affect of the test sample. When, for instance, lubricating oils having a viscosity of about 100 SUS at 210° F. are tested in the apparatus described infra, the transmitted pressure impulses will have a maximum amplitude at ambient temperatures of approximately 4 mm. Hg above atmospheric pressure when the applied pressure impulses have a maximum amplitude of approximately 6 mm. Hg above atmospheric pressure.

The pulsating pressure impulses can be provided by any well-known technique, such as a bellows, a plunger and piston, controlled air pressures, and the like. Suitable means for measuring the pressure changes include pressure transducers of the type which convert pressure to a proportionate electrical signal which is or can be transmitted to a recorder or indicator. Also, sensitive mechanical pressure gages can be used to indicate or record the pressure changes. Temperature measuring apparatus include thermometers as well as thermocouples of the recording or indicating type. The temperature measuring device and the pressure sensitive device can both be connected to a recorder so as to automatically indicate pressure change as a function of temperature.

Figure 1:
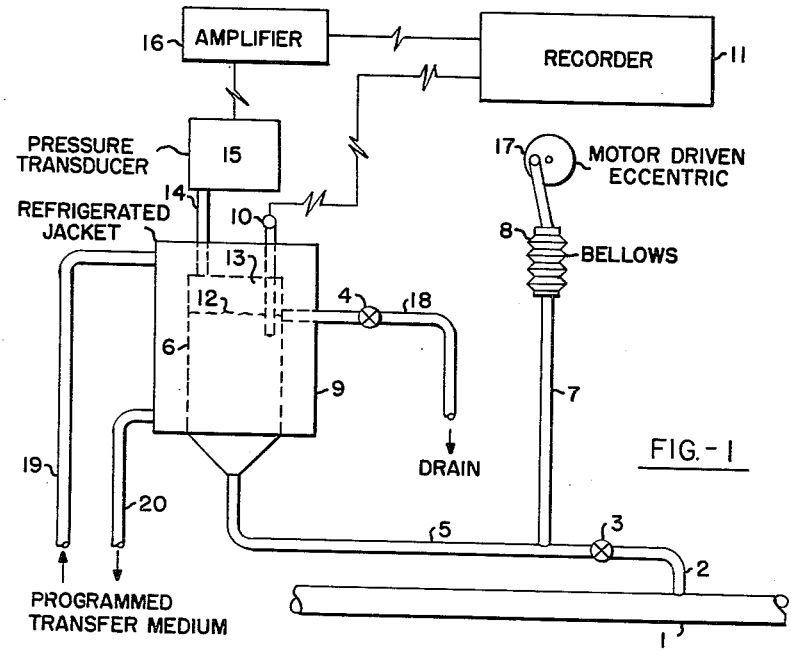
FIGURE 1 illustrates a suitable pour point apparatus for use according to the present invention.

Referring now to the drawings, FIGURE 1 illustrates a suitable apparatus for determining pour points according to the present invention. Here, a sample to be tested is withdraw from pipeline 1 through line 2 by opening valves 3 and 4 and is passed through line 5 to sample chamber 6 and through line 7 to Sylphon bellows 8. Sample chamber 6 is mounted in jacket 9 which has a heat transfer medium circulating through it. Sample chamber 6 also has a thermocouple 10 connected thereto and adjusted so as to penetrate the upper surface of the sample to be tested at a point near the wall of sample chamber 6. Thermocouple 10 is connected to recorder 11. The sample in sample chamber 6 is not permitted to exceed level 12 in the sample chamber 6, thus leaving enclosed air space 13 in the sample chamber. Air space 13 is connected through line 14 to pressure transducer 15. The electric signals from pressure transducer 15 are amplified by amplifier 16 and the amplified signals are then transmitted to recorder 11. The Sylphon bellows 8 are activated by a motorized eccentric cam assembly 17. The Sylphon bellows 8 are pulsed at an amplitude which varies from about 0.1 to 20 mm. Hg above atmospheric pressure and at a frequency of 5 to 45 cycles per minute. As the Sylphon bellows 8 transmit pressure pulses to the sample, the temperature of the sample is raised at a uniform rate. Heat transfer medium is circulated through jacket 9 by means of lines 19 and 20. (Prior to beginning the heating, the normally fluid sample is cooled by means of a cold heat transfer medium in jacket 9 to a temperature below its pour point, thus solidifying.) After the pour point is measured for a given sample, valves 3 and 4 are opened to simultaneously expel the old sample and to allow a new sample to flow into the apparatus as already described. The old sample flows out through line 18 and valve 4. Sylphon bellows are metal bellows obtainable from the Fulton Sylphon Division of Robert Shaw-Fulton Controls Company located in Knoxville, Tennessee.

Figure 2:
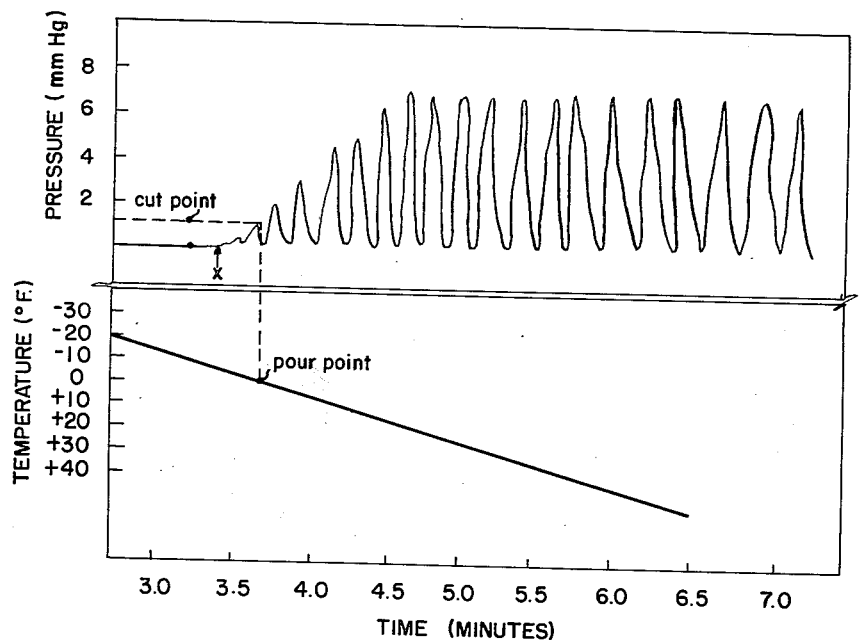
FIGURE 2 illustrates a sample recording as it might appear if made on a dual track recorder connected to an apparatus of the type shown in FIGURE 1.

FIGURE 2 illustrates a sample recording, using the method of the invention, as it might appear if made on a dual track strip recorder. The two variables recorded are the transmitted pressure pulse and the temperature of the sample (each as a function of time. When the test sample is heated to about its pour point, the amplitude of the transmitted pressure impulse increases. This increase continues as the temperature is increased. With most oils the pour point corresponds to a transmitted impulse of about 5% of the forcing pulse. By this, it is meant that the pour point, as determined by a carefully controlled ASTM manual test, will correspond to that temperature at which the transmitted pressure pulse is about 5% of the forcing pulse. That is, with a forcing pulse of about 20 mm. Hg above atmospheric pressure, the pour point will correspond to that temperature at which the transmitted pressure pulse is about 1 mm. Hg above atmospheric pressure. The level of transmitted pressure pulse corresponding to the ASTM standard pour point is defined as the "cut-point." This cut-point will be a function of the particular equipment used, the type of oil being tested, the sensitivity of the recording equipment, etc. Exact determination of the cut-point for a given type of oil can be accomplished by comparing several carefully controlled ASTM manual tests with the strip charts. Once a cut-point is established, the pour points can be rapidly determined for great numbers of test samples with a high degree of repeatability and accuracy.

Other systems for electrically recording temperatures and for recording the point at which the liquid surface undergoes a change in movement in response to pressure impulses will be obvious to one skilled in the art and can be used. For example, the present inventors have used a device wherein a switch is actuated by a pre-selected level of transmitted impulse and only the pour point, itself, is recorded.

COMPARATIVE DATA

The advantages of the instant invention over the ASTM standard method are that pour points of oils can be determined in less time, using fewer man hours, and with a higher degree of repeatability. The present invention has accomplished these advantages by replacing the judgment of an operator with a mechanical reading. Moreover, one operator can, with the aid of this technique, run more tests in a given period of time.

If, instead of heating the sample from below its pour point, the sample is cooled while applying the pressure pulses, results are obtained which are an improvement over the ASTM manual technique. These improved results (in terms of repeatability) are not, however, nearly as precise as those obtained by means of the present heating technique. Theorizing for a moment, it appears that the increased repeatability of the present technique is due to the lack of sample disturbance while the crystal structure, which causes solidification, is being formed.

Table I illustrates the agreement obtained in determining pour points according to the present technique as compared with the ASTM method. The cut-point was not adjusted for the various samples but, instead, the point at which the transmitted pressure began to increase was used as the cut-point (see point "X" in FIGURE 2). These data were obtained using an apparatus of the type shown in FIGURE 1.

*Table I.—Pour Point Agreement Between the ASTM Manual Test and the Present Technique*

| Range of Six Lubricants Tested | Range of Eight Lubricants Tested | Range of Fourteen Lubricants Tested | Range of Seven Heating Oils Tested |
|---|---|---|---|
| ±4° F. | ±6° F. | ±6° F. | ±9.25° F. |

Table II illustrates the high degree of repeatability that has been obtained using the present technique in an apparatus as described in FIGURE 1.

*Table II.—Repeatability of the Present Technique*

| | Sample Numbers | Pour Point (° F.) |
|---|---|---|
| Mineral Oil No. 1 | 1 | 22 |
| | 2 | 23 |
| | 3 | 24 |
| | 4 | 25 |
| | 5 | 25 |
| Mineral Oil No. 2 | 1 | 17 |
| | 2 | 17 |
| | 3 | 16.5 |
| | 4 | 15 |
| | 5 | 15 |

Here, it can be seen that the repeatability of the present method when applied to different samples of the same oil is considerably better than that for the ASTM standard, i.e., ±1.5° F. for the present technique versus ±5.0° F. for the ASTM standard test.

It should be understood that the agreement between these two methods (ASTM and the present technique) can be increased by carefully determining the cut-point for any given type of oil and then testing all of the samples of that type oil. Preferably a new cut-point should be determined for each different type of oil. The present inventors have carefully determined the cut-points for a number of different oils and have found that the pour points thus obtained are substantially identical to the pour points obtained from carefully controlled ASTM standards tests (manual).

Table III illustrates the agreement between the present technique and the ASTM–D–97 test when cut-points are carefully determined for several oils.

*Table III*

| | Pour Point by ASTM-D-97, °F. | Pour Point by Present Technique, °F. |
|---|---|---|
| Mineral Oil A | 22 | 22.5 |
| Mineral Oil B | 16.0 | 15.5 |
| Synthetic Lubricating Oil C | −34 | −32.5 |
| Synthetic Lubricating Oil D | −6 | −6.5 |

Because of the high degree of repeatability of the present method (see Table II) it is believed by the inventors that the present test may supplant the ASTM manual test. If one were not interested in duplicating the results of the ASTM manual test, he could obtain an equally significant number (for quality control) with a high degree of repeatability by using a fixed cut-point for all samples, e.g., point "X" of FIGURE 2.

Having described this invention with reference to certain specific examples, it will be realized that numerous modifications and applications will be apparent to those skilled in the art.

What is claimed is:

1. A method for determining the pour point of a normally liquid composition which comprises cooling said liquid composition in a partially filled container containing a gas to a temperature below its pour point, transmitting pressure pulses through said composition, simultaneously increasing the temperature of said composition and determining the pour point from the fluctuations in the pressure of said gas with respect to temperature.

2. A method according to claim 1, wherein the temperature of the composition is increased at a rate of from 0.5 to 5° F. per minute.

3. A method according to claim 1, wherein said normally liquid composition is an oil.

4. A method according to claim 1, wherein the amplitude of said pressure pulse is from 0.1 to 20 mm. Hg above atmospheric pressure.

5. A method according to claim 1, wherein the frequency of said pressure pulse is from 5 to 45 cycles per minute.

6. A method for determining the pour point of a normally liquid composition which comprises cooling said liquid composition in a partially filled container containing a gas to a temperature of from 5° to 50° F. below its pour point, transmitting pressure pulses through said cooled composition, said pressure pulses having an initial amplitude of from 0.1 to 20 mm. Hg above atmospheric pressure and a frequency of from 5 to 45 cycles per minute, simultaneously increasing the temperature of said composition at a rate of from 0.5 to 5° F. per minute, and determining the pour point of said composition from the fluctuations in the pressure of said gas with respect to temperature.

References Cited in the file of this patent
UNITED STATES PATENTS

| | | |
|---|---|---|
| 2,938,386 | Anderson et al. | May 31, 1960 |
| 2,952,152 | Fisher et al. | Sept. 13, 1960 |
| 3,077,764 | Kapff | Feb. 19, 1963 |